Patented Jan. 22, 1946

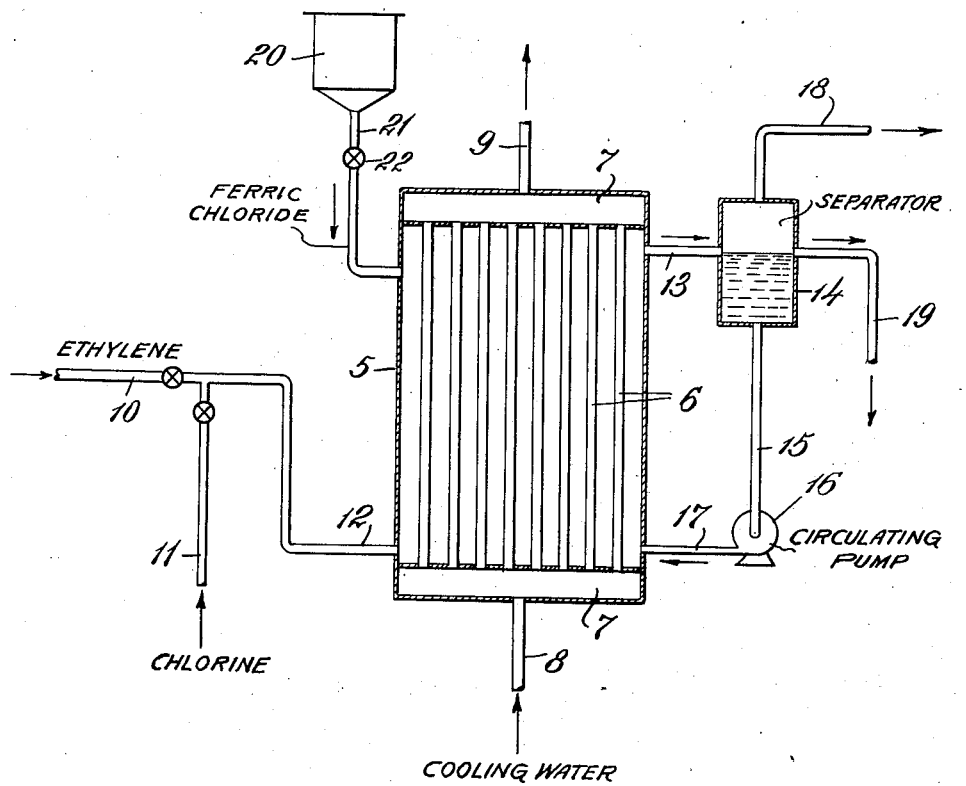

2,393,367

UNITED STATES PATENT OFFICE 2,393,367

MANUFACTURE OF DICHLORETHANE

John A. S. Hammond, Glenbrook, Conn., assignor, by mesne assignments, of one-half to U. S. Industrial Chemicals, Inc., New York, N. Y., a corporation of Delaware, and one-half to Wyandotte Chemicals Corporation, Wyandotte, Mich., a corporation of Michigan Application May 14, 1943, Serial No. 486,993

3 Claims. (Cl. 260—660)

This invention relates to the production of dichlorethane or, as it is generally known in the trade, ethylene dichloride, and particularly to an improvement in the method of preparing the product.

As heretofore practised, the method of preparing dichlorethane consists in introducing ethylene and chlorine into a body of liquid dichlorethane. The resulting reaction is exothermic and the body of liquid is cooled to maintain the optimum reaction temperature. The desired reaction is one of addition, as follows:

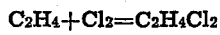

$$C_2H_4 + Cl_2 = C_2H_4Cl_2$$

There is, however, a marked tendency for chlorine to react by substitution with the diethylene chloride to produce undesirable higher chlorinated products, principally trichlor ethane, according to the reaction:

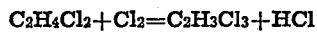

$$C_2H_4Cl_2 + Cl_2 = C_2H_3Cl_3 + HCl$$

Such higher chlorinated products when formed cannot be eliminated readily and constitute impurities in the dichlorethane which make it unsuitable for numerous uses.

It is the object of the invention to provide an improvement in the method of preparing dichlorethane whereby the tendency for the chlorine to substitute and thereby produce higher chlorinated products such as trichlorethane is substantially overcome, thus avoiding the introduction of contaminating materials to the product.

Other objects and advantages of the invention will be apparent as it is better understood by reference to the following specification and the accompanying drawing, which illustrates diagrammatically an apparatus suitable for the practice of the method.

I have discovered that anhydrous ferric chloride in relatively minute proportions, i. e., from approximately 0.05% to 0.25% by weight of the liquid dichlorethane will, when present during the reaction of ethylene and chlorine in the body of liquid dichlorethane, act as a depressant for the substitution reaction, thereby increasing the yield of dichlorethane and avoiding contamination of the product with higher chlorination compounds. Slightly more or less ferric chloride may be used, but the proportions indicated are best suited to accomplish the purpose of the invention.

This result is quite unexpected, particularly because the addition of metallic chlorides in substantial quantities has been suggested heretofore to catalytically increase the rate of reaction of ethylene with chlorine. When so used, ferric chloride does not have the effect noted of depressing the substitution reaction. On the contrary, the reaction by substitution proceeds, as in the absence of any ferric chloride, to produce substantial quantities of higher chlorination compounds. Furthermore, the use of anhydrous ferric chloride in the proportions of less than 0.25% by weight of the liquid dichlorethane has no appreciable catalytic effect upon the rate of reaction.

In carrying out the invention, I may use any suitable apparatus, preferably a receptacle 5 having a plurality of tubes 6 extending therethrough to heads 7. A cooling agent such as water is introduced through a pipe 8 and withdrawn through a pipe 9 to maintain the temperature of the dichlorethane in the receptacle at a suitable point, for example at about 40° C. Ethylene and chlorine, preferably in the molecular ratio of 1.1:1 are delivered by pipes 10 and 11 to a pipe 12 which introduces the mixture beneath the surface of a body of dichlorethane in the receptacle 5. A pipe 13 permits overflow to a separator 14 from which the liquid may be withdrawn through a pipe 15 and recirculated by a pump 16 and pipe 17. Vapors are delivered from the separator by a pipe 18 and may be treated in any desirable manner to recover hydrochloric acid which may be formed by the reaction. A portion of the dichlorethane is withdrawn continuously through a pipe 19 and is subjected to any suitable additional treatment to recover the desired commercial product.

The ferric chloride may be introduced as such, but because of its hygroscopic properties it is advantageous to first dissolve it in anhydrous alcohol in which it is very soluble. The ferric chloride solution may be fed as required from a suitable receptacle 20 through a pipe 21 controlled by a valve 22 to the receptacle 5 wherein it is mixed with the body of liquid dichlorethane in which the reaction is conducted. As indicated, the amount of ferric chloride thus added should not materially exceed 0.25% of the weight of the liquid dichlorethane. Since some of the dichlorethane is withdrawn continuously, it is desirable to similarly feed ferric chloride at a suitable rate. Mechanism for controlling the feed is available, and forms no part of the present invention.

The advantage obtained by the procedure as described may be readily demonstrated. If, for example, ethylene and chlorine in the molecular ratio of 1.1:1 are reacted in a bath of liquid dichlorethane maintained at a temperature of about 40° C., about 85.6% of the chlorine reacts by addition to form dichlorethane and about 7.7% reacts by substitution to form undesired higher chlorination products. If, however, the reaction is conducted in the presence of 0.05% to 0.25% of ferric chloride based upon the weight of the dichlorethane in the bath, all other conditions of the reaction being maintained, 97.2% of the chlorine reacts by addition while only 1.75% of the chlorine reacts by substitution. Under similar conditions, I have conducted the reaction so that as little as 0.54% of the chlorine added reacted by substitution. The results show the marked repressing action of small amounts of ferric chloride on the substitution of chlorine in the ethylene molecule.

The invention has the advantage of increasing the yield of dichlorethane while at the same time avoiding the introduction of undesirable higher chlorination products. It also reduces the loss of chlorine which is incidental to the formation of higher chlorination products. As a result, the product is more suitable for numerous commercial uses than the dichlorethane prepared by the procedure heretofore employed.

Various changes may be made in the details of operation and in the apparatus employed without departing from the invention or sacrificing any of the advantages thereof.

I claim:

1. The method of preparing dichlorethane which comprises reacting ethylene and chlorine in a molecular ratio of approximately 1.1 to 1 within a liquid bath of dichlorethane and in the presence of ferric chloride acting as a depressant of the substitution reaction with chlorine, the ferric chloride being present in proportion not substantially exceeding 0.25% by weight of the liquid bath.

2. The method of preparing dichlorethane which comprises reacting ethylene and chlorine in a molecular ratio of approximately 1.1 to 1 within a liquid bath of dichlorethane and in the presence of ferric chloride acting as a depressant of the substitution reaction with chlorine, the ferric chloride being present in proportion of between 0.05% and 0.25% of the weight of the liquid bath.

3. The method of preparing dichlorethane which comprises reacting ethylene and chlorine in a molecular ratio of slightly less than 1 of chlorine to 1 of ethylene within a liquid bath of dichlorethane and in the presence of ferric chloride acting as a depressant of the substitution reaction with chlorine, the ferric chloride being present in proportion not substantially exceeding 0.25% by weight of the liquid bath.

JOHN A. S. HAMMOND.